Patented Aug. 5, 1952

2,606,180

UNITED STATES PATENT OFFICE 2,606,180

EXTRACTING OF GLOBULINS

Margaret Ethel Mackay and Ralph Ambrose Kekwick, London, England, assignors to National Research Development Corporation, London, England No Drawing. Application August 22, 1950, Serial No. 180,891. In Great Britain August 30, 1949

17 Claims. (Cl. 260—112)

The specification of British Patent No. 603,998 described and claims a method for the separation of fibrinogen and prothrombin from mammalian, in particular human blood. As described in that specification, after precipitation of the prothrombin the supernatant liquid was removed and further treated (if desired after treatment to remove other globulins) to produce a fluid suitable for transfusion.

The present invention is concerned with the removal of such other globulins from the supernatant liquid referred to, in particular gamma and beta globulins, and the separation of the one globulin from the other. This is done according to the invention by adjusting the pH of the supernatant liquid removed from the prothrombin to a value between 5.00 and 6.50, diluting it with sterile distilled water to an ionic strength between 0.12 and 0.012, gradually adding ether to bring the ether content of the mixture to 16 to 18.5 volumes per cent and at the same time lowering the temperature to a value from —2 to —3.5° C. and allowing to stand, and removing the resulting precipitate which contains the greater part of the beta and gamma globulins.

The beta globulin is separated from the resulting precipitate by dissolving it in sufficient buffer solution of sufficiently low pH to bring it into solution below say pH 4.8, adding a buffer solution of higher pH to bring the pH of the solution to between 4.8 and 5.3, adding sterile distilled water to reduce the ionic strength to 0.012 and 0.006, adding ether to bring the ether content to between 8 and 12 volumes per cent, allowing to stand, and removing the resulting precipitate of mainly beta globulin.

The gamma globulin is separated from the supernatant liquid from which the beta globulin precipitate was separated by adjusting the pH of this liquid to between 6.00 and 7.5 and adding ether to bring the ether content to from 10 to 13.5 volumes per cent, and removing the resulting precipitate of gamma globulin.

All these operations (including the treatment of the blood plasma) are effected at low temperature i. e. between 0° C. and —3.5° under aseptic conditions and the reagents are held at a similar or slightly higher temperature, say +2° C.; also in all these operations and throughout this specification by ether we mean di-ethyl ether.

Details will now be given of the conditions of operation with human blood but it is to be understood that other mammalian e. g. bovine blood, and avian blood, can be dealt with under approximately the same conditions.

The procedure may be as described in the aforesaid British patent specification No. 603,998 up to the precipitation of prothrombin, which may conveniently be effected at pH 5.35, and the removal of the supernatant solution.

Gamma globulin is prepared from prothrombin supernatant in 3 stages.

*Stage 1.—The precipitation of beta and gamma globulin from the prothrombin supernatant*

This is a 3–4 per cent protein solution, having the composition—albumin 70.8%, alpha and beta globulins 14.5%, gamma globulins 14.7%. The solution contains 10 volumes per cent ether, and the ionic strength is 0.12, calculated from the known salt concentrations.

The pH of the solution is adjusted to 5.50 by the addition of sodium bicarbonate or sodium hydroxide solution of suitable molarity, for instance 0.5 M $NaHCO_3$. The solution is diluted by the addition of three volumes of distilled water to give an ionic strength of 0.035. The ether content of the mixture is gradually raised to 18.5 volumes per cent, and at the same time the temperature of the mixture is lowered to —3.5° C. by standing the reaction vessel in an alcohol bath refrigerated to —5° C. A precipitate is formed which is allowed to settle overnight at —3.5° C. As much as possible of the supernatant is syphoned off and the sediment is removed from the remainder by centrifuging at —3.5° C. The supernatant may be treated as in the said British patent specification No. 603,998 to produce a fluid suitable for transfusion.

The precipitate prepared under the conditions described above contains 90 per cent of the gamma globulin present in the starting material and analyses electrophoretically as follows: Albumin 10 per cent, alpha and beta globulins 46.5 per cent, gamma globulins 43.5 per cent.

The above stated conditions are preferred in the case of human blood plasma, but globulins may be precipitated from the prothrombin supernatant, derived from other mammalian blood plasma, in the following range of conditions: pH 5.00–6.50, I 0.12–0.012, ether 16, —18.5 volumns per cent, temp. —2° C. to —3.5° C.

The electrophoretic composition of the precipitate will vary depending on the precise conditions of the precipitation.

*Stage 2.—The separation of alpha and beta globulins from the gamma globulin*

The preciptate is dissolved in sufficient acetate phosphate buffer pH 4.0 (HAc 0.043 M—$Na_2HPO_4$ 0.007 M) to bring it into solution at pH 4.6. The solution is cooled to 0° C., and by the addition of acetate phosphate buffer of pH 6.0 (HAc 0.023 M-Na₂HPO₄ 0.027 M) the pH is adjusted to 4.97 ± 0.02, sterile distilled water is added to reduce the ionic strength to 0.010 and the ether is brought to 9 vols per cent at 0° C. The precipitate which forms contains the bulk of the alpha and beta globulins, and is removed as described above, after allowing equilibration to take place overnight at 0° C.

The conditions for the separation of beta and gamma globulin are critical, but partial separation is achieved under the conditions pH 4.8–5.3, I 0.012–0.006, ether 8–12 volumes percent, temp. 0° C.

*Stage 3.—Precipitation of gamma globulin from beta globulin supernatant*

Gamma globulin is precipitated from the supernatant liquid by adjusting the pH to 6.50–6.75 with sodium bicarbonate or sodium hydroxide solution of appropriate molarity, for instance 0.5 M NaHCO₃, and bringing the ether to 18.5 volumes per cent at −3.5° C. The ionic strength is 0.025. This procedure will precipitate 90% of the gamma globulin in solution.

The above conditions are preferred, but gamma globulins may be precipitated at a pH range of 6.00–7.5 and at 10–18.5 volumes of ether per cent.

The gamma globulin so obtained has electrophoretically a purity of 95 per cent. The purity of the beta globulin is difficult to assess on account of its complex electrophoretic behaviour, but it is uncontaminated with albumin or gamma globulin.

Gamma globulins may be further purified by dissolving the precipitate in phosphate buffer pH 7.0, I–1.0, bringing the ionic strength to 0.05 by diluting with sterile distilled water, and the ether to 18 volumes per cent at a temperature of −3.5° C. The gamma globulin precipitated is free from contaminating albumin and beta globulin.

What we claim is:

1. A process for the separation of beta and gamma globulins from the supernatant liquid obtained by precipitating fibrinogen and then prothrombin from blood plasma selected from mammalian and avian species, which includes the steps of adjusting the pH of the liquid to a value between 5.00 and 6.50, diluting with sterile distilled water to an ionic strength between 0.12 and 0.012, adding ether to bring the ether content of the mixture to from 16 to 18.5 volumes per cent, lowering the temperature to from −2 to −3.5° C. and allowing to stand and removing the resulting precipitate which contains the greater part of the beta and gamma globulins.

2. A process as set forth in claim 1 in which the pH of the supernatant liquid removed from the prothrombin is brought to 5.50.

3. A process as set forth in claim 2 in which the pH is brought to the specified volume by the addition of 0.5 sodium bicarbonate.

4. A process as set forth in claim 1 in which the dilution is taken to an ionic strength of 0.035.

5. A process as set forth in claim 1 in which the final addition of ether is such as to bring the ether content to 18.5 volumes per cent.

6. A process as set forth in claim 1 in which the temperature at the time of final addition of ether is lowered to −3.5° C.

7. A process for the separation of beta globulin from the supernatant liquid obtained by precipitating fibrinogen and then prothrombin from blood plasma selected from mammalian and avian species, which includes the steps set out in claim 1 and then dissolving the final precipitate in sufficient buffer solution of sufficiently low pH to bring it into solution at pH below 4.8, adding a buffer solution of higher pH to bring the pH of the solution to between 4.8 and 5.3 adding sterile distilled water to reduce the ionic strength to between 0.012 and 0.006, adding ether to bring the ether content to between 8 and 12 volumes per cent, allowing to stand and removing the resulting precipitate of mainly beta globulin.

8. A process as set forth in claim 7 for the separation of beta globulin from the supernatant liquid obtained from human blood plasma in which the dissolution is effected in an acetate phosphate buffer of pH 4.0 in sufficient quantity to produce a solution of pH 4.6 and the pH adjusted to 4.97±0.02 by addition of acetate phosphate buffer of pH 6.0.

9. A process as set forth in claim 7 in which dilution with distilled water is taken to an ionic strength of 0.010.

10. A process as set forth in claim 7 in which the addition of ether is taken to 9 volumes per cent.

11. A process as set forth in claim 7 in which the dissolution and succeeding steps are all effected at 0° C.

12. A process for the separation of gamma globulin from the supernatant liquid obtained by precipitating fibrinogen and then prothrombin from blood plasma selected from mammalian and avian species which includes the steps set forth in claim 7 then adjusting the pH of the final separated liquid from 6.00 to 7.5 and adding ether to bring the ether content to from 10 to 18.5 volumes per cent, and removing the resulting precipitate of gamma globulin.

13. A process as set forth in claim 12 in which the pH is brought to between 6.50 and 6.75.

14. A process as set forth in claim 13 in which the adjustment is effected with 0.5M sodium bicarbonate.

15. A process as set forth in claim 12 in which the ether content is brought to 18.5 volumes per cent.

16. A process as set forth in claim 12 in which the steps are effected at −3.5° C.

17. A process as set forth in claim 12 in which the gamma globulins are further purified by dissolving in phosphate buffer of pH 7 and ionic strength 1.0, diluting with distilled water down to an ionic strength of 0.05, adding ether to 18 volumes per cent at a temperature of −3.5° C. and removing the precipitate of gamma globulins.

MARGARET ETHEL MACKAY.
RALPH AMBROSE KEKWICK.

REFERENCES CITED

The following references are of record in the file of this patent:

FOREIGN PATENTS

| Number | Country | Date |
|---|---|---|
| 603,998 | Great Britain | June 25, 1948 |